(12) United States Patent
Yamazaki et al.

(10) Patent No.: US 8,820,986 B2
(45) Date of Patent: Sep. 2, 2014

(54) CONTROL DEVICE FOR VEHICLE LAMP, VEHICLE LAMP, AND METHOD OF CONTROLLING VEHICLE LAMP

(75) Inventors: Masashi Yamazaki, Shizuoka (JP); Kazuo Goto, Shizuoka (JP); Toshikazu Tomono, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 533 days.

(21) Appl. No.: 13/169,563

(22) Filed: Jun. 27, 2011

(65) Prior Publication Data
US 2012/0002430 A1 Jan. 5, 2012

(30) Foreign Application Priority Data
Jul. 1, 2010 (JP) ................................ 2010-151180

(51) Int. Cl.
*F21S 8/00* (2006.01)

(52) U.S. Cl.
USPC .......................................... 362/464; 362/465

(58) Field of Classification Search
USPC .................. 362/464, 465, 466, 467
See application file for complete search history.

(56) References Cited

U.S. PATENT DOCUMENTS

| 5,896,011 A | 4/1999 | Zillgitt |
| 6,430,521 B1 | 8/2002 | Toda |

FOREIGN PATENT DOCUMENTS

| DE | 199 08 482 A1 | 9/2000 |
| EP | 0 906 850 A2 | 4/1999 |
| JP | 2000-85459 A | 3/2000 |
| JP | 2001-341578 A | 12/2001 |
| JP | 2004-314856 A | 11/2004 |
| JP | 2006-27300 A | 2/2006 |

OTHER PUBLICATIONS

Search Report dated Jan. 25, 2013, issued by the European Patent Office in counterpart European Patent Application No. 11170977.0.

*Primary Examiner* — Sharon Payne
(74) *Attorney, Agent, or Firm* — Sughrue Mion, PLLC

(57) ABSTRACT

There is provided a control device for controlling a vehicle lamp provided in a vehicle. The device includes: a receiver configured to receive an inclination angle of the vehicle with respect to a horizontal plane from an inclination detector; a controller configured to: i) generate a first control signal instructing the vehicle lamp to adjust an optical axis of the vehicle lamp in response to a change of the inclination angle, when the vehicle has already stopped; and ii) generate a second control signal instructing the vehicle lamp to maintain the optical axis of the vehicle lamp, when the vehicle is traveling on a road surface; and a transmitter configured to transmit the first control signal or the second control signal to an optical axis adjuster provided in the vehicle lamp.

8 Claims, 8 Drawing Sheets

US 8,820,986 B2

CONTROL DEVICE FOR VEHICLE LAMP, VEHICLE LAMP, AND METHOD OF CONTROLLING VEHICLE LAMP

CROSS-REFERENCE TO RELATED APPLICATION

This application claims priority from Japanese Patent Application No. 2010-151180, filed on Jul. 1, 2010, the entire contents of which are hereby incorporated by reference.

BACKGROUND

1. Technical Field

The present disclosure relates to a control device for a vehicle lamp, the vehicle lamp, and a method of controlling the vehicle lamp.

2. Related Art

An automatic leveling control, which changes an irradiation direction by automatically adjusting the position of an optical axis of a vehicle headlight according to an inclination angle of a vehicle, has been known in the past. In automatic leveling control, a vehicle height sensor is used as an inclination detector of a vehicle and the position of an optical axis of a headlight is adjusted based on a pitch angle of a vehicle that is detected by the vehicle height sensor. Meanwhile, a structure, which performs automatic leveling control using a gravity sensor as an inclination detector, is disclosed in JP-A-2000-085459. Further, a structure, which performs automatic leveling control using a three-dimensional gyro-sensor as an inclination detector, is disclosed in JP-A-2004-314856.

If an acceleration sensor, such as a gravity sensor or a three-dimensional gyro-sensor, is used as an inclination detector of a vehicle, it may be possible to reduce the manufacturing cost and weight of an automatic leveling system as compared to a case where a vehicle height sensor is used. Meanwhile, the inventors have recognized that there is the following problem in the automatic leveling control using the acceleration sensor in the related art.

That is, an inclination angle detected by the acceleration sensor is an inclination angle of a vehicle with respect to a horizontal plane that includes an inclination angle of a road surface with respect to the horizontal plane and an inclination angle of a vehicle with respect to the road surface. Meanwhile, an inclination angle of a vehicle required for the automatic leveling control is an inclination angle of a vehicle with respect to the road surface. Meanwhile, when a detected value of the acceleration sensor is changed in the automatic leveling control in the related art, the position of an optical axis has been adjusted without determining whether the change of the detected value of the acceleration sensor is the change of the inclination angle of a road surface with respect to a horizontal plane or the change of the inclination angle of a vehicle with respect to the road surface. For this reason, it has been desired to accurately adjust the position of an optical axis in the automatic leveling control using the acceleration sensor in the related art.

SUMMARY OF THE INVENTION

Exemplary embodiments of the present invention may address the above disadvantages and other disadvantages not described above. However, the present invention is not required to overcome the disadvantages described above, and thus, an exemplary embodiment of the present invention may not overcome any disadvantages.

Exemplary embodiments provide a technique performing automatic leveling control, which acquires an inclination angle of a vehicle with respect to a horizontal plane from an inclination detector and adjusts the position of an optical axis of a vehicle lamp, with higher accuracy.

According to one or more illustrative aspecsts of the present invention, there is provided a control device for controlling a vehicle lamp provided in a vehicle. The device includes: a receiver configured to receive an inclination angle of the vehicle with respect to a horizontal plane from an inclination detector; a controller configured to: i) generate a first control signal instructing the vehicle lamp to adjust an optical axis of the vehicle lamp in response to a change of the inclination angle, when the vehicle has already stopped; and ii) generate a second control signal instructing the vehicle lamp to maintain the optical axis of the vehicle lamp, when the vehicle is traveling on a road surface; and a transmitter configured to transmit the first control signal or the second control signal to an optical axis adjuster provided in the vehicle lamp.

According to one or more illustrative aspects of the present invention, there is provided a vehicle lamp provided in a vehicle. In the vehicle lamp, an optical axis of the vehicle lamp is adjested in response to a change of an inclination angle of the vehicle with respect to a horizontal plane, when the vehicle has already stopped, and the optical axis is maintained even if the inclination angle is changed, when the vehicle is tranvelling on a road surface.

According to one or more illustrative aspects of the present invention, there is provided a method of controlling a vehicle lamp provided in a vehicle. The method includes: detecting an inclination angle of the vehicle with respect to a horizontal plane; adjusting an optical axis of the vehicle lamp in response to a change of the inclination angle, when the vehicle has already stopped; and maintaining the optical axis of the vehicle lamp, when the vehicle is traveling on a road surface.

According to one or more illustrative aspects of the present invention, there is provided a vehicle lamp system. The vehicle lamp system includes: a vehicle lamp mounted in a vehicle so as to irradiate an area in front of the vehicle with light; an inclination detector that detects an inclination angle of the vehicle with respect to a horizontal plane; an optical axis adjuster that adjusts an optical axis of the vehicle lamp; and a control device for controlling the vehicle lamp. The control device includes: a receiver configured to receive the inclination angle from the inclination detector; a controller configured to: i) generate a first control signal instructing the vehicle lamp to adjust the optical axis of the vehicle lamp in response to a change of the inclination angle, when the vehicle has already stopped; and ii) generate a second control signal instructing the vehicle lamp to maintain the optical axis of the vehicle lamp, when the vehicle is traveling on a road surface; and a transmitter configured to transmit the first control signal or the second control signal to the optical axis adjuster. The optical axis adjuster adjusts the optical axis of the vehicle lamp based on the first control signal or the second control signal.

Other aspects and advantages of the present invention will be apparent from the following description, the drawings and the claims.

DETAILED DESCRIPTION

Figure 1:
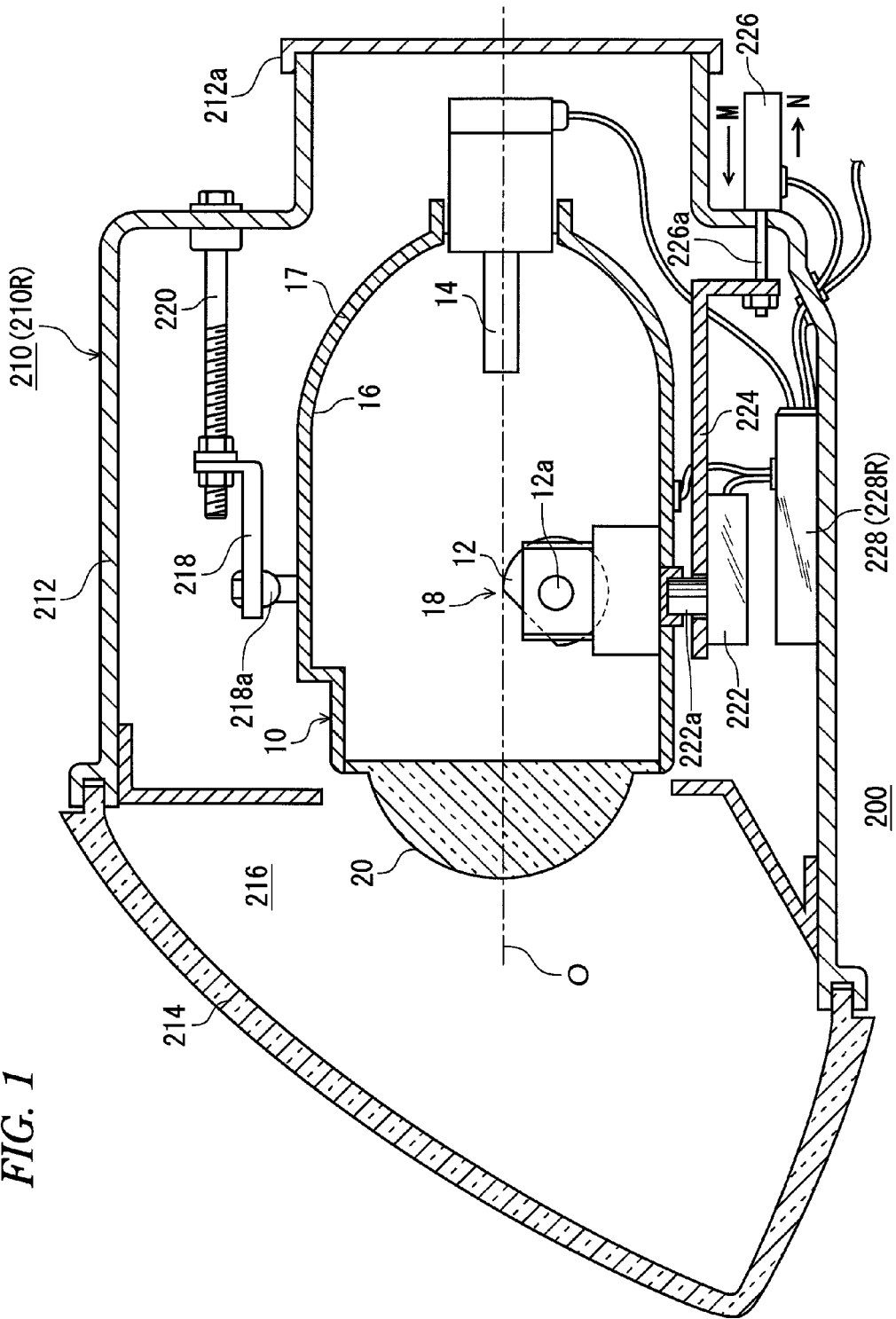
FIG. 1 is a schematic vertical cross-sectional view illustrating the internal structure of a vehicle lamp system according to a first embodiment.

Preferred embodiments of the invention will be described below with reference to the drawings. The same or equivalent elements, members, and processes, which are shown in the respective drawings, are denoted by the same reference numerals, and repeated description thereof will be appropriately omitted. Further, the embodiments are illustrative and do not limit the invention. The characteristics or combinations described in the embodiments are not necessarily essential in the invention.

(First Embodiment)

FIG. 1 is a schematic vertical cross-sectional view illustrating the internal structure of a vehicle lamp system according to a first embodiment. A vehicle lamp system 200 according to this embodiment is an adaptive front-lighting system where a pair of headlight units symmetrical to each other is disposed at the left and right portions of a vehicle in a vehicle width direction, respectively. The headlight units, which are disposed at the right and left portions of the vehicle, have substantially the same structure except for the symmetrical structure. Accordingly, the structure of a right headlight unit 210R will be described below, and the description of a left headlight unit will be appropriately omitted. Meanwhile, when being described, the respective members of the left headlight unit are denoted by the same reference numerals as those of the members of the headlight unit 210R that correspond to the members of the left headlight unit.

The headlight unit 210R includes a lamp body 212 and a translucent cover 214. The lamp body 212 includes an opening that is formed on the front side of a vehicle. The translucent cover 214 covers the opening. The lamp body 212 includes a detachable cover 212a that is provided on the rear side thereof in the longitudinal direction of a vehicle and can be detached when a bulb 14 is replaced. A lamp chamber 216 is formed by the lamp body 212 and the translucent cover 214. A lamp unit 10 (vehicle lamp), which irradiates the area in front of the vehicle with light, is received in the lamp chamber 216.

A lamp bracket 218, which includes a pivot mechanism 218a serving as a swiveling center of the lamp unit 10 in vertical and horizontal directions, is formed at a part of the lamp unit 10. The lamp bracket 218 is threadably engaged with aiming adjustment screws 220 that are rotatably supported by the wall surface of the lamp body 212. Accordingly, the lamp unit 10 is fixed at a predetermined position in the lamp chamber 216 that is set according to the adjustment states of the aiming adjustment screws 220, and can swivel about the pivot mechanism 218a at that position so that the posture of the lamp unit is changed to a forward inclined posture or a backward inclined posture.

Further, a rotating shaft 222a of a swivel actuator 222 of an adaptive front-lighting system (AFS) for a curved road, which irradiates the area in front in a traveling direction along which the subject vehicle is traveling while a vehicle is traveling on a curved road, is fixed to the lower surface of the lamp unit 10. The swivel actuator 222 makes the lamp unit 10 swivel about the pivot mechanism 218a in the traveling direction based on the steering angle data provided from the vehicle, the shape data of a traveling road provided from a navigation system, a relative positional relationship between a subject vehicle and a front vehicle including an oncoming vehicle and a preceding vehicle, and the like. As a result, the irradiation area of the lamp unit 10 faces not the area in front of the vehicle but the area in front on the curved road, so that the driver's forward field of view is improved. The swivel actuator 222 may be formed of, for example, a stepping motor. Meanwhile, if a swivel angle has a fixed value, a solenoid or the like may also be used as the swivel actuator. The swivel actuator 222 is fixed to a unit bracket 224.

A leveling actuator 226, which is disposed outside the lamp body 212, is connected to the unit bracket 224. The leveling actuator 226 is formed of, for example, a motor or the like that pushes and pulls a rod 226a in directions of arrows M and N. When the rod 226a is pushed in the direction of the arrow M, the lamp unit 10 swivels about the pivot mechanism 218a so as to be inclined backward. On the contrary, when the rod 226a is pulled in the direction of the arrow N, the lamp unit 10 swivels about the pivot mechanism 218a so as to be inclined forward. When the lamp unit 10 is inclined backward, it may be possible to perform leveling adjustment that makes a pitch angle of an optical axis O, that is, an angle of the optical axis O in a vertical direction be directed to the upper side. When the lamp unit 10 is inclined forward, it may be possible to perform leveling adjustment that makes the pitch angle of the optical axis O be directed to the lower side. It may be possible to adjust the optical axis according to the posture of the vehicle by performing the above-mentioned leveling adjustment. As a result, it may be possible to adjust the range of light, which is emitted forward from the vehicle lamp system 200, to an optimum distance.

An irradiation controller 228 (control device), which controls the turning-on/off of the lamp unit 10 or controls the formation of a light distribution pattern, and adjusts the optical axis of the lamp unit 10, is disposed on the inner wall surface of the lamp chamber 216 below the lamp unit 10. An irradiation controller 228R, which controls the headlight unit 210R, is disposed in FIG. 1. The irradiation controller 228R also controls the swivel actuator 222, the leveling actuator 226, and the like. Meanwhile, the irradiation controller 228R may be provided outside the headlight unit 210R.

The lamp unit 10 may include an aiming adjustment mechanism. For example, an aiming pivot mechanism (not shown), which functions as a swiveling center during aiming adjustment, is disposed at a connection portion between the unit bracket 224 and the rod 226a of the leveling actuator 226. Furthermore, the above-mentioned aiming adjustment screws 220 are disposed at the lamp bracket 218 with a gap therebetween in the vehicle width direction. For example, when the two aiming adjustment screws 220 are rotated in a counterclockwise direction, the lamp unit 10 swivels about the aiming pivot mechanism so as to be inclined forward. Accordingly, the optical axis O is adjusted so as to be directed to the lower side. Likewise, when the two aiming adjustment screws 220 are rotated in a clockwise direction, the lamp unit 10 swivels about the aiming pivot mechanism so as to be inclined backward. Accordingly, the optical axis O is adjusted so as to be directed to the upper side. Furthermore, when the aiming adjustment screw 220, which is disposed on the left side in the vehicle width direction, is rotated in the counterclockwise direction, the lamp unit 10 swivels about the aiming pivot mechanism so as to be in a right swivel posture. Accordingly, the optical axis O is adjusted so as to be directed to the right side. Moreover, when the aiming adjustment screw 220, which is disposed on the right side in the vehicle width direction, is rotated in the counterclockwise direction, the lamp unit 10 swivels about the aiming pivot mechanism so as to be in a left swivel posture. Accordingly, the optical axis O is adjusted so as to be directed to the left side. This aiming adjustment is performed at the time of the shipment of vehicles, the inspection of vehicles, or the replacement of the headlight unit 210R. Further, the headlight unit 210R is adjusted to a designed posture, and the formation of a light distribution pattern or the adjustment of the position of the optical axis is controlled based on this posture.

The lamp unit 10 includes a shade mechanism 18 including a rotary shade 12, a bulb 14 as a light source, a lamp housing 17 that supports a reflector 16 on the inner wall thereof, and a projection lens 20. For example, an incandescent bulb, a halogen lamp, a discharge bulb, an LED, or the like may be used as the bulb 14. An example where the bulb 14 is formed of a halogen lamp is described in this embodiment. The reflector 16 reflects light that is emitted from the bulb 14. Further, a part of the light emitted from the bulb 14 and the light reflected by the reflector 16 are guided to the projection lens 20 through the rotary shade 12.

The rotary shade 12 is a cylindrical member that is rotatable about a rotating shaft 12a. Moreover, the rotary shade 12 includes a cutout portion that is formed by cutting out a part of the rotary shade in an axial direction, and a plurality of shade plates (not shown). Any one of the cutout portion and the shade plates is moved onto the optical axis O, so that a predetermined light distribution pattern is formed. At least a part of the reflector 16 is formed in an ellipsoidal shape, and the ellipsoidal surface of the reflector is set so that the shape of the cross-section of the ellipsoidal surface, which includes the optical axis O of the lamp unit 10, becomes at least a part of an elliptical shape. The ellipsoidal portion of the reflector 16 has a first focus substantially at the center of the bulb 14, and has a second focus on the rear focal plane of the projection lens 20.

The projection lens 20 is disposed on the optical axis O extending in the longitudinal direction of a vehicle. The bulb 14 is disposed on the rear side of a rear focal plane that is a focal plane including the rear focus of the projection lens 20. The projection lens 20 is formed of a plano-convex aspheric lens of which the front surface is a convex surface and the rear surface is a flat surface. The projection lens projects a light source image, which is formed on the rear focal plane, onto a virtual vertical screen, which is formed in front of the vehicle lamp system 200, as an inverted image. Meanwhile, the structure of the lamp unit 10 is not particularly limited thereto, and the lamp unit may be a reflective lamp unit or the like that does not include the projection lens 20.

Figure 2:
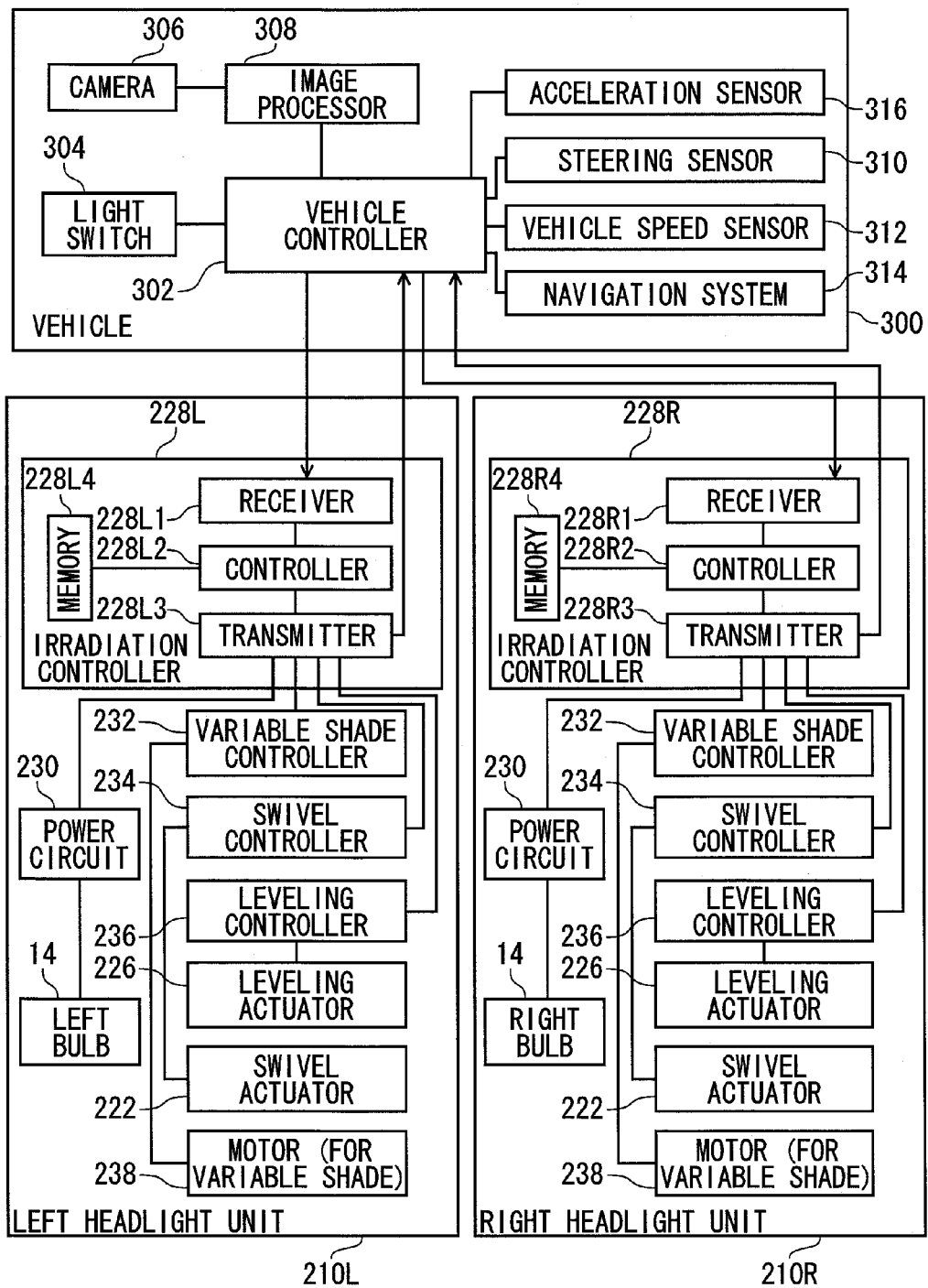
FIG. 2 is a functional block diagram illustrating an operational interaction between an irradiation controller of a headlight unit and a vehicle controller provided in a vehicle.

FIG. 2 is a functional block diagram illustrating an operational interaction between the irradiation controller of the above headlight unit and a vehicle controller provided in a vehicle. Meanwhile, since the structure of the right headlight unit 210R is basically the same as that of the left headlight unit 210L as described above, only the right headlight unit 210R will be described and the description of the left headlight unit 210L will be omitted.

The irradiation controller 228R of the headlight unit 210R includes a receiver 228R1, a controller 228R2, a transmitter 228R3, and a memory 228R4. The irradiation controller 228R controls a power circuit 230 based on the information obtained from a vehicle controller 302 mounted on a vehicle 300, and controls the turning-on of the bulb 14. Further, the irradiation controller 228R controls a variable shade controller 232, a swivel controller 234, and a leveling controller 236 (optical axis adjuster) based on the information obtained from the vehicle controller 302. Various kinds of information, which are transmitted from the vehicle controller 302, are received by the receiver 228R1, and various control signals are generated from the information, which is stored in the memory 228R4, according to the information and need by the controller 228R2. Further, the control signals are transmitted to the leveling controller 236, the swivel controller 234, the variable shade controller 232, or the power circuit 230 of the lamp unit 10 by the transmitter 228R3. The memory 228R4 is, for example, a nonvolatile memory.

The variable shade controller 232 controls the driving of a motor 238, which is connected to the rotating shaft 12a of the rotary shade 12 through a gear mechanism, and moves a desired shade plate or the cutout portion onto the optical axis O. Meanwhile, rotation information, which represents the rotational state of the rotary shade 12 and is provided from a detection sensor such as an encoder provided on the motor 238 or the rotary shade 12, is provided to the variable shade controller 232. Accordingly, accurate rotation control is realized by feedback control. Further, the swivel controller 234 adjusts the angle of the optical axis O of the lamp unit 10 in the vehicle width direction (horizontal direction) by controlling the swivel actuator 222. For example, when a vehicle travels on a curved road or turns right or left, the optical axis O of the lamp unit 10 is directed to the traveling direction where the vehicle is to travel.

The leveling controller 236 adjusts the optical axis O of the lamp unit 10 in the vertical direction of the vehicle (the direction of the pitch angle) by controlling the leveling actuator 226. For example, the leveling controller adjusts the range of light, which is emitted toward the front side, to an optimum distance by adjusting the posture of the lamp unit 10 according to whether the posture of a vehicle is inclined forward or backward at the time of increase/decrease of the amount of load or the number of persons on the vehicle. The vehicle controller 302 also provides the same information as the information, which is provided to the headlight unit 210R, to the headlight unit 210L, and an irradiation controller 228L (control device) of the headlight unit 210L performs the same control as the control that is performed by the irradiation controller 228R.

In the case of this embodiment, the light distribution patterns formed by the headlight units 210L and 210R may be switched according to the operation of a light switch 304 that is performed by a driver. In this case, each of the irradiation controllers 228L and 228R determines a light distribution pattern, which is to be formed by the lamp unit 10, by controlling the motor 238 through the variable shade controller 232 according to the operation of the light switch 304.

The headlight units 210L and 210R of this embodiment detect the circumstances around the vehicle by various sensors and may be automatically controlled regardless of the operation of the light switch 304 so as to form light distribution patterns optimal for the state of the vehicle 300 or the circumstances around the vehicle. For example, when it may be possible to detect that preceding vehicles, oncoming vehicles, pedestrians, or the like are present in front of a subject vehicle, the irradiation controllers 228L and 228R determine that glare should be prevented based on the information obtained from the vehicle controller 302. Then, the irradiation controllers form low beam light distribution patterns by the lamp units 10. Further, when it may be possible to detect that preceding vehicles, oncoming vehicles, pedestrians, or the like are not present in front of a subject vehicle, the irradiation controllers 228L and 228R determine that the driver's visibility should be improved. Then, the irradiation controllers form high beam light distribution patterns where light is not blocked by the rotary shades 12. Furthermore, when a so-called left or right-side high light distribution pattern, a special high beam light distribution pattern well known in the related art such as a V-beam light distribution pattern, or a special low beam light distribution pattern can be formed in addition to the low beam light distribution patterns and the high beam light distribution patterns, a light distribution pattern optimal for a front vehicle may be formed according to the presence/non-presence of a front vehicle. This control mode may be referred to as an ADB (Adaptive Driving Beam) mode.

A camera 306, such as a stereo camera, for recognizing an object is connected to the vehicle controller 302 in order to detect objects, such as preceding vehicles or oncoming vehicles as described above. Frame data of images taken by the camera 306 are subjected to predetermined image processing such as object recognition processing in an image processor 308, and the results of recognition are provided to the vehicle controller 302. For example, if data including feature points, which represent a vehicle and are previously stored in the vehicle controller 302, are present in the recognition result data provided from the image processor 308, the vehicle controller 302 recognizes the presence of the vehicle and provides information about the vehicle to the irradiation controllers 228L and 228R. The irradiation controllers 228L and 228R receive the information about the vehicle from the vehicle controller 302, determine light distribution patterns optimal for the vehicle, and form the light distribution patterns. Here, the "feature points representing a vehicle" mean, for example, light spots that have luminance equal to or higher than a predetermined luminance and appear in an estimated area where the headlights, sign lamps such as tail lamps, and the like of a front vehicle are present. Further, for example, if data including feature points, which represent a pedestrian and are previously stored, are present in the recognition result data provided from the image processor 308, the vehicle controller 302 provides information about the pedestrian to the irradiation controllers 228L and 228R. Then, the irradiation controllers 228L and 228R form light distribution patterns optimal for the pedestrian.

Furthermore, the vehicle controller 302 may also acquire information from a steering sensor 310, a vehicle speed sensor 312, a navigation system 314, an acceleration sensor 316 (inclination detector) that are mounted on the vehicle 300. Accordingly, the irradiation controllers 228L and 228R may select a light distribution pattern that is formed according to the traveling state or traveling posture of the vehicle 300, or easily change the light distribution pattern by changing the direction of the optical axis O. For example, when luggage is loaded in a luggage compartment formed at the rear portion of the vehicle or occupants are seated in the rear seats, the posture of the vehicle becomes a backward inclined posture. When luggage is unloaded or occupants get out of the rear seats, the vehicle is inclined forward from the backward inclined posture. The irradiation direction of the lamp unit 10 is also changed in a vertical direction according to the posture of the vehicle 300, so that the range of light emitted forward increases or decreases. Further, the irradiation controllers 228L and 228R receive the inclination angle of the vehicle 300 from the acceleration sensor 316 through the vehicle controller 302, and set the pitch angle of the optical axis O to an angle according to the posture of the vehicle by controlling the leveling actuator 226 through the leveling controller 236. Since the leveling adjustment of the lamp unit 10 is performed in real time based on the posture of the vehicle as described above, it may be possible to adjust the range of light, which is emitted forward, to an optimum distance even though the posture of the vehicle is changed according to the state of use of the vehicle 300. This control mode may be referred to as an automatic leveling control mode. For example, when the automatic formation control for automatically forming light distribution patterns is instructed by the light switch 304, the automatic formation control for automatically forming light distribution patterns, which includes the above-mentioned various control modes, is performed.

Subsequently, the automatic leveling control of the vehicle lamp system 200 having the above-mentioned structure will be described in detail.

The acceleration sensor 316 of the vehicle lamp system 200 is, for example, a three-axis acceleration sensor that has an X axis, a Y axis, and a Z axis perpendicular to one another. The acceleration sensor 316 is mounted on the vehicle 300 so that the X axis of the sensor is parallel to the longitudinal axis of the vehicle 300, the Y axis of the sensor is parallel to the horizontal axis of the vehicle 300, and the Z axis of the sensor is parallel to the vertical axis of the vehicle 300. The acceleration sensor 316 can detect a resultant acceleration vector of a gravity acceleration vector and a motion acceleration vector that is generated due to the movement of the vehicle 300, and outputs numerical values of the respective components of the resultant acceleration vector in three axis directions. When the vehicle 300 has already stopped, the acceleration sensor 316 outputs numerical values of the respective components of the gravity acceleration vector in three axis directions. That is, the acceleration sensor 316 can detect the inclination angle (total angle) of the vehicle with respect to the horizontal plane, which includes the inclination angle (first angle) of a road surface with respect to the horizontal plane and the inclination angle (second angle) of the vehicle with respect to the road surface, as a vector. Hereinafter, the inclination angle of a road surface with respect to the horizontal plane is appropriately referred to as a "road surface angle" and is denoted by reference character θr; the inclination angle of a vehicle with respect to the road surface is appropriately referred to as a "vehicle posture angle" and is denoted by reference character θv; and the inclination angle of the vehicle with respect to the horizontal plane is appropriately referred to as a "total angle" and is denoted by reference character θ. Meanwhile, each of the road surface angle θr, the vehicle posture angle θv, and the total angle θ is an angle of the X axis in the vertical direction, that is, an angle of a pitch direction of the vehicle 300.

Here, an object of the automatic leveling control is to keep the range of light, which is emitted toward the front side, to an optimum distance by absorbing the change of the range of light, which is emitted forward from the vehicle lamp, caused by the change of the inclination angle of the vehicle. Accordingly, the inclination angle of the vehicle, which is required for the automatic leveling control, is a vehicle posture angle θv. Meanwhile, the vehicle lamp system 200 according to this embodiment performs control so as to adjust the position of the optical axis of the lamp unit 10 if the vehicle posture angle θv is changed and so as to keep the position of the optical axis of the lamp unit 10 if the road surface angle θr is changed.

Further, in this embodiment, the change of the total angle θ during the stop of the vehicle is estimated as the change of the vehicle posture angle θv and the change of the total angle θ during the traveling of the vehicle is estimated as the change of the road surface angle θr. That is, since the vehicle posture angle θv is rarely changed during the traveling of the vehicle by the increase or decrease of the amount of load or the number of persons on the vehicle, the change of the total angle θ during the traveling of the vehicle may be estimated as the change of the road surface angle θr. Meanwhile, since the road surface angle θr is rarely changed during the stop of the vehicle by the movement of the vehicle 300, the change of the total angle θ during the stop of the vehicle may be estimated as the change of the vehicle posture angle θv. The irradiation controller 228R receives the total angle θ from the acceleration sensor 316, generates a control signal that instructs the lamp unit to adjust the position of the optical axis with respect to the change of the total angle θ during the stop of the vehicle, and avoids generating the control signal with respect to the change of the total angle θ during the traveling of the vehicle. Further, the irradiation controller transmits the control signal to the leveling controller 236. Meanwhile, the irradiation controller 228R may generate a control signal that instructs the lamp unit to keep the position of the optical axis with respect to the change of the total angle θ during the traveling of the vehicle, and may transmit the control signal to the leveling controller 236.

Specifically, firstly, the vehicle 300 is placed on the horizontal plane, for example, at a vehicle maker's manufacturing plant, a dealer's maintenance shop, or the like, and this state is referred to as a reference state. The reference state is a state where one person gets in the driver's seat of the vehicle 300, or an empty state where there is no person in the vehicle. Further, an initialization signal is transmitted to the irradiation controller 228R by the operation of a switch of an initialization processor in the plant, the communication of a CAN (Controller Area Network) system that connects the irradiation controller 228R to the acceleration sensor 316 through the vehicle controller 302. The initialization signal, which is transmitted to the irradiation controller 228R, is received by the receiver 228R1 and is sent to the controller 228R2. When receiving the initialization signal, the controller 228R2 performs initial aiming adjustment while using an output value of the acceleration sensor 316, which is received by the receiver 228R1, as a reference inclination angle. Moreover, the controller 228R2 records the information about the fact that the reference value of the road surface angle θr is 0° and the reference value of the vehicle posture angle θv is 0° in the memory 228R4. Accordingly, the controller 228R2 keeps these reference values.

During the traveling of the vehicle, the controller 228R2 (irradiation controller 228R) avoids generating a control signal that instructs the lamp unit to adjust the position of the optical axis. It may be possible to determine the fact that the vehicle 300 is traveling, by vehicle speed obtained from, for example, the vehicle speed sensor 312. "During the traveling of the vehicle" means a period, for example, between when the detected value of the vehicle speed sensor 312 exceeds 0 and when the detected value of the vehicle speed sensor 312 becomes 0. "During the traveling of the vehicle" may be appropriately set based on the experiments or simulations of a designer.

Further, when the vehicle is stopping, the controller 228R2 calculates the road surface angle θr during the stop of the vehicle by subtracting the reference value of the vehicle posture angle θv, which is read out from the memory 228R4, from the current inclination angle of the vehicle 300 that is detected by the acceleration sensor 316, that is, the total angle θ. Furthermore, this road surface angle θr is recorded in the memory 228R4 as a new reference value of a road surface angle θr. "During the stop of the vehicle" means a period, for example, when the detected value of the acceleration sensor 316 is stable after the detected value of the vehicle speed sensor 312 becomes 0. The reason why "During the stop of the vehicle" means a period until the detected value of the acceleration sensor 316 is stable is that some time is required until the posture of the vehicle becomes stable after the stop of the vehicle 300 and it is difficult to detect an accurate total angle θ when the posture of the vehicle is not stable. This "period until the detected value of the acceleration sensor 316 is stable" may be a period until the variation of the detected value of the acceleration sensor 316 per unit time becomes equal to or smaller than a predetermined value and may be a period until a predetermined time has passed after the detected value of the vehicle speed sensor 312 becomes 0. "During the stop of the vehicle", the "predetermined value", and the "predetermined time" may be appropriately set based on the experiments or simulations of a designer.

Meanwhile, when a difference between the reference value of the road surface angle θr recorded in the memory 228R4 and the road surface angle θr during the stop of the vehicle calculated by subtracting the reference value of the vehicle posture angle θv from the total angle θ during the stop of the vehicle is equal to or larger than a predetermined value, the controller 228R2 may record the calculated road surface angle Or in the memory 228R4 as a new reference value. Further, the controller 228R2 may calculate a road surface angle θr when the total angle θ at the time of the start of the vehicle 300 is different from the total angle θ during the stop of the vehicle. In this case, it may be possible to avoid frequently rewriting the reference value of the road surface angle θr and to reduce the control load of the controller 228R2.

During the stop of the vehicle, the controller 228R2 repeatedly calculates the vehicle posture angle θv at a predetermined timing. The vehicle posture angle θv is calculated by subtracting the reference value of the road surface angle θr, which is recorded in the memory 228R4, from the current total angle θ. When a difference between the calculated vehicle posture angle θv and the reference value of the vehicle posture angle θv is equal to or larger than a predetermined value, the controller 228R2 generates a control signal, which is used for the adjustment of the optical axis, based on the newly obtained vehicle posture angle θv. Further, the optical axis is adjusted based on this control signal. Further, the calculated vehicle posture angle θv is recorded in the memory 228R4 as a new reference value. Since the optical axis is adjusted when a difference between the calculated vehicle posture angle θv and the reference value is equal to or larger than a predetermined value as described above, it may be possible to avoid frequently adjusting the optical axis. As a result, it may be possible to reduce the control load of the controller 228R2 and to lengthen the life of the leveling actuator 226. "During the stop of the vehicle" means a period, for example, until the start of the vehicle after the detected value of the acceleration sensor 316 is stable. "The time of the start of the vehicle" means, for example, the time when the detected value of the vehicle speed sensor 312 exceeds 0. Meanwhile, the calculation of the vehicle posture angle θv may not be repeated at a predetermined timing and may be performed at the time of the start of the vehicle. "During the stop of the vehicle" may be appropriately set based on the experiments or simulations of a designer.

Moreover, for example, power is not supplied to the irradiation controller 228R during the turning-off of the ignition (IG). The controller 228R2 receives an IG-OFF signal generated from the vehicle controller 302 during the turning-off of the ignition when the memory 228R4 is not a nonvolatile memory, or the reference value of the road surface angle θr is recorded in a nonvolatile memory (not shown) when a power supply voltage supplied to the irradiation controller 228R is equal to or smaller than a predetermined voltage. Accordingly, since it may be possible to keep the reference value of the road surface angle θr even though the ignition is turned off, it may be possible to perform automatic leveling control with high accuracy even after the ignition is turned on.

Further, when the ignition is turned on, that is, when the irradiation controller 228R is started, the controller 228R2 calculates the vehicle posture angle θv from the detected value of the acceleration sensor 316 and the reference value of the road surface angle θr. Furthermore, the controller 228R2 determines the position of the optical axis using the calculated vehicle posture angle θv, and records and keeps the calculated vehicle posture angle θv in the memory 228R4 as a new reference value. Accordingly, even though the vehicle posture angle θv is changed while the ignition is turned off, the optical axis O is adjusted to an appropriate position during the turning-off of the ignition. Therefore, it may be possible to improve the accuracy of the automatic leveling control.

Figure 3:
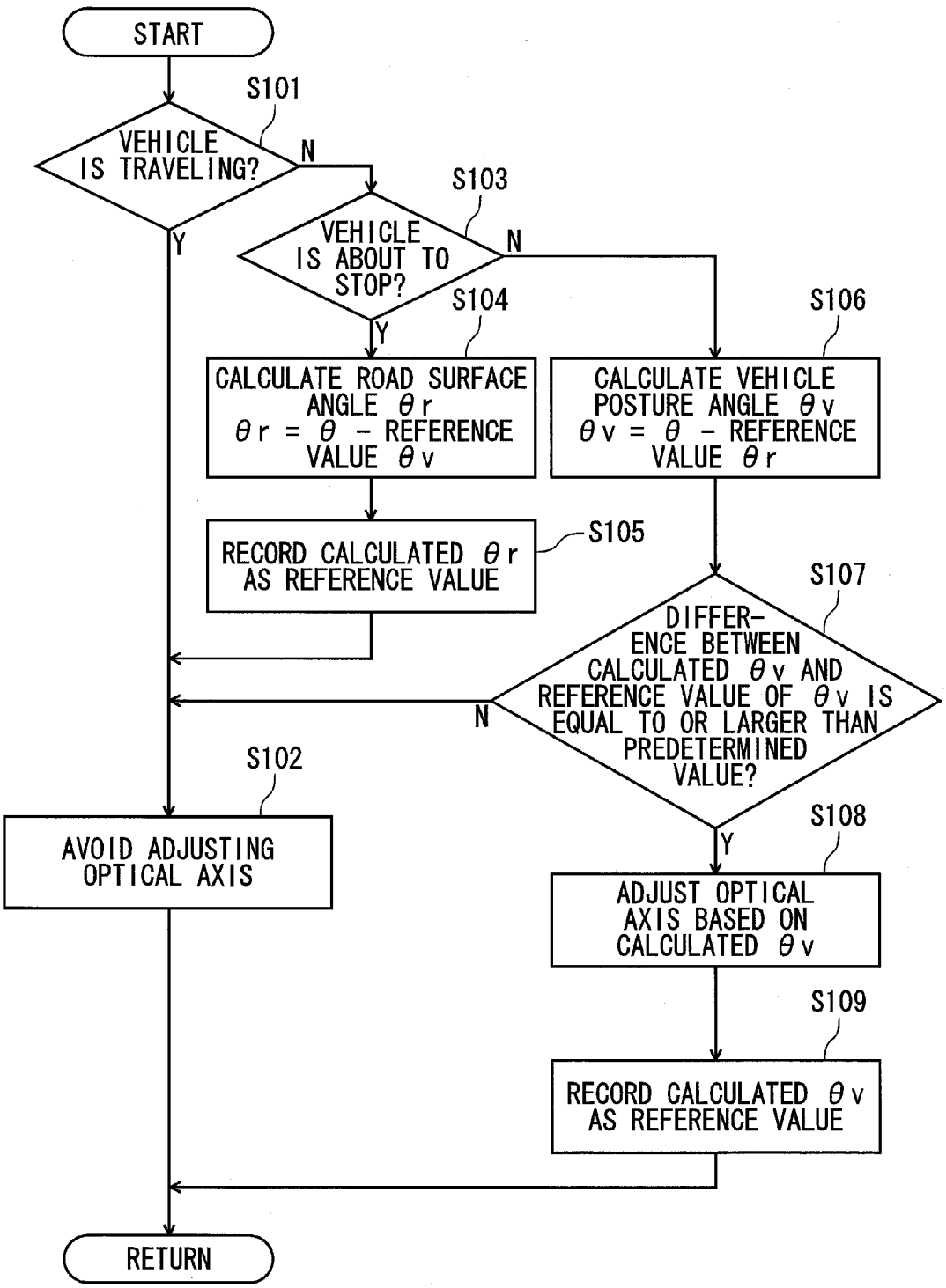
FIG. 3 is a flowchart of automatic leveling control of the vehicle lamp system according to the first embodiment.

FIG. 3 is a flowchart of automatic leveling control of the vehicle lamp system according to the first embodiment. In the flowchart of FIG. 3, each process is denoted by the combination of a number and the letter S (the initial letter of step) meaning a step. Further, a certain determination is performed by a process that is denoted by the combination of a number and the letter S. If the result of the determination is positive, Y (the initial letter of Yes) is added, for example, this is represented as Y in S101. If the result of the determination is negative, N (the initial letter of No) is added, for example, this is represented as N in S101. For example, when the automatic leveling control mode is instructed by the light switch 304, this flow is repeated at a predetermined timing during the turning-on of the ignition by the irradiation controller 228R (controller 228R2) and is ended at the time of the turning-off of the ignition.

Firstly, the controller 228R2 determines whether a vehicle is traveling on a road surface (S101). If the vehicle is traveling (Y in S101), the controller 228R2 avoids adjusting the optical axis (S102) without generating a control signal that instructs the lamp unit to adjust the position of the optical axis and ends this routine. If the vehicle is not traveling (N in S101), the controller 228R2 determines whether the vehicle is about to stop (S103). If the vehicle is about to stop (Y in S103), the controller 228R2 calculates the road surface angle θr by subtracting the reference value of the vehicle posture angle θv from the current total angle θ (S104) and records the calculated road surface angle θr in the memory 228R4 as a new reference value. Further, the irradiation controller 228R avoids adjusting the optical axis (S102), and ends this routine.

If the vehicle is not about to stop (N in S103), this case means that the vehicle has already stopped. Accordingly, the controller 228R2 calculates the vehicle posture angle θv by subtracting the reference value of the road surface angle θr from the current total angle θ (S106). Subsequently, the controller 228R2 determines whether a difference between the calculated vehicle posture angle θv and the reference value of the vehicle posture angle θv is equal to or larger than a predetermined value (S107). If the difference between the calculated vehicle posture angle θv and the reference value of the vehicle posture angle θv is smaller than the predetermined value (N in S107), the controller 228R2 avoids adjusting the optical axis (S102) and ends this routine. If the difference between the calculated vehicle posture angle θv and the reference value of the vehicle posture angle θv is equal to or larger than the predetermined value (Y in S107), the controller 228R2 adjusts the position of the optical axis based on the calculated vehicle posture angle θv (S108). Further, the controller 228R2 records the calculated vehicle posture angle θv in the memory 228R4 as a reference value (S109), and ends this routine.

Meanwhile, the left headlight unit 210L performs the same control as the control of the irradiation controller 228L (controller 228L2). Alternatively, one of the irradiation controllers 228L and 228R may calculate the vehicle posture angle θv or the road surface angle θr, and the other thereof may acquire the calculated vehicle posture angle θv or the calculated road surface angle θr and adjust the optical axis O.

When performing automatic leveling control based on the total angle θ detected by the acceleration sensor 316 in the vehicle lamp system 200, the irradiation controllers 228L and 228R adjust the position of the optical axis of the lamp unit if the vehicle posture angle θv is changed and maintains the position of the optical axis of the lamp unit 10 if the road surface angle θr is changed. Further, in this embodiment, the change of the total angle θ during the stop of the vehicle is estimated as the change of the vehicle posture angle θv and the change of the total angle θ during the traveling of the vehicle is estimated as the change of the road surface angle θr. Furthermore, each of the irradiation controllers 228L and 228R generates a control signal that instructs the lamp unit to adjust the position of the optical axis with respect to the change of the total angle θ during the stop of the vehicle, and avoids generating the control signal with respect to the change of the total angle θ during the traveling of the vehicle or generates a control signal that instructs the lamp unit to maintain the position of the optical axis. Accordingly, it may be possible to perform the automatic leveling control, which uses the acceleration sensor 316 as an inclination detector, with higher accuracy. Further, since the inclination angle of the vehicle 300 is detected using the acceleration sensor 316 in this embodiment, a vehicle height sensor does not need to be used. For this reason, as compared to a case where a vehicle height sensor is used, this embodiment is advantageous in terms of reduction in cost and has a high degree of freedom in the design of a vehicle body.

(Second Embodiment)

Figure 4:
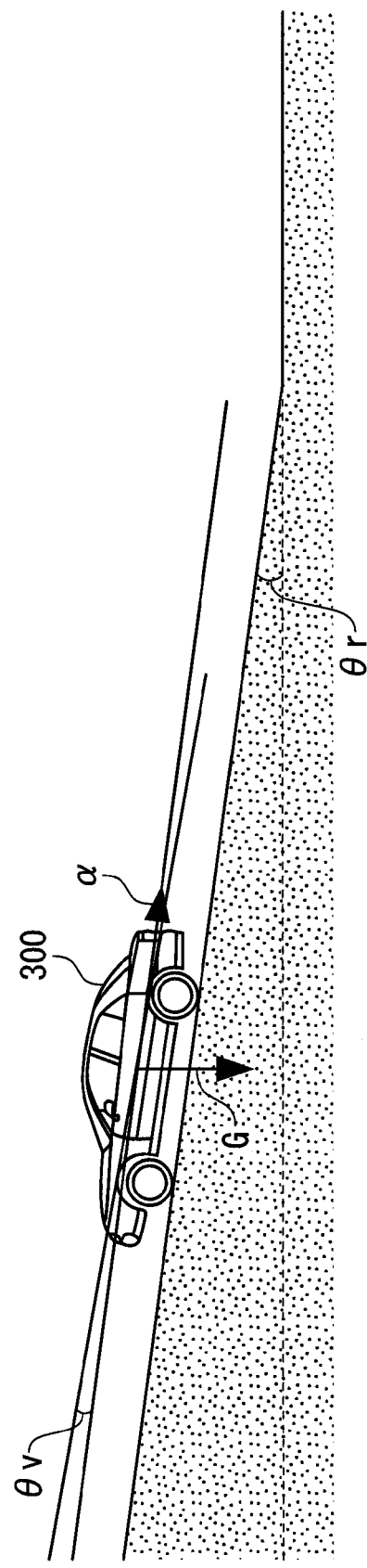
FIG. 4 is a view illustrating automatic leveling control of a vehicle lamp system according to a second embodiment.

A vehicle lamp system 200 according to a second embodiment performs automatic leveling control in consideration of the change of the vehicle posture angle θv that may occur during the traveling of a vehicle. This embodiment will be described below. Meanwhile, the main structure of the vehicle lamp system 200, the main flow of automatic leveling control, and the shape of light distribution patterns that can be formed are the same as those of the first embodiment. Accordingly, the same elements as the elements of the first embodiment are denoted by the same reference numerals, and appropriately will not be described and shown. FIG. 4 is a view illustrating automatic leveling control of the vehicle lamp system according to the second embodiment.

In the first embodiment, the change of a vehicle inclination angle (total angle θ) during the traveling of the vehicle is estimated as the change of the road surface angle θr. Accordingly, it may be possible to perform automatic leveling control with high accuracy by a simple control structure. However, although it is rare, the vehicle posture angle θv may be changed during the traveling of the vehicle. For example, if the vehicle 300 is a large vehicle such as a bus, there is a possibility that an occupant moves in the vehicle during the traveling of the vehicle. This may cause the change of the vehicle posture angle θv. For this reason, if the change of the total angle θ during the traveling of the vehicle is estimated as the change of the road surface angle θr, there is a possibility that an error occurs between an actual road surface angle θr and the estimated road surface angle θr.

Further, in this embodiment, whether a road surface is horizontal is determined at least at one timing of the time of the start of the vehicle and the time of the stop of the vehicle. Furthermore, the reference value of the road surface angle θr is corrected according to the result of the determination of whether a road surface is horizontal.

The determination of whether a road surface is horizontal at the time of the start of the vehicle and the correction of the reference value according to the result thereof will be performed as follows. Firstly, the controller 228R2 determines whether the vehicle 300 starts. If the variation of vehicle speed per unit time (the motion acceleration of the vehicle 300), which is obtained from the detected value of the vehicle speed sensor 312, is equal to or larger than a predetermined value, the controller 228R2 may determine that the vehicle 300 starts. It may be possible to appropriately set the predetermined value of the motion acceleration where it is determined that the vehicle 300 starts. Further, the controller 228R2 determines whether the vehicle 300 goes straight. The controller 228R2 can determine whether the vehicle goes straight, from the detected value of the steering sensor 310 or the numerical value of the Y-axis component of the acceleration sensor 316. For example, when a steering angle is about 0°, the controller 228R2 determines that the vehicle 300 goes straight, from the detected value of the steering sensor 310. It may be possible to appropriately set the range of the steering angle where it is determined that the vehicle 300 goes straight.

If the vehicle 300 goes straight, the controller 228R2 calculates the square of the magnitude of the detected value vector of the acceleration sensor 316 and the square of the magnitude of the motion acceleration vector of the vehicle 300 obtained from the vehicle speed sensor 312 after a predetermined time from the start of the vehicle. Moreover, if a difference between the square of the magnitude of the detected value vector of the acceleration sensor 316 and the square of the magnitude of the motion acceleration vector of the vehicle 300 is equal to the square of the magnitude of a gravity acceleration vector, the controller 228R2 corrects the kept reference value of the road surface angle θr so that the kept reference value of the road surface angle θr is close to 0°.

Further, the determination of whether a road surface is horizontal at the time of the stop of the vehicle and the correction of the reference value according to the result thereof will be performed as follows. Firstly, the controller 228R2 determines whether the stop of the vehicle 300 is predicted. If the variation of vehicle speed per unit time (the motion deceleration of the vehicle 300, that is, negative motion acceleration), which is obtained from the detected value of the vehicle speed sensor 312, is equal to or larger than a predetermined value, the controller 228R2 may predict that the vehicle 300 will stop. It may be possible to appropriately set the predetermined value of the motion deceleration where the stop of the vehicle 300 is predicted. Furthermore, the controller 228R2 determines whether the vehicle 300 goes straight.

If the vehicle speed becomes 0 and the vehicle 300 stops when the vehicle 300 goes straight, the controller 228R2 calculates the square of the magnitude of the detected value vector of the acceleration sensor 316 and the square of the magnitude of the motion acceleration vector of the vehicle 300 obtained from the vehicle speed sensor 312 before a predetermined time from the stop of the vehicle. Moreover, if a difference between the square of the magnitude of the detected value vector of the acceleration sensor 316 and the square of the magnitude of the motion acceleration vector of the vehicle 300 is equal to the square of the magnitude of a gravity acceleration vector, the controller 228R2 corrects the reference value of the road surface angle θr obtained at the time of the stop of the vehicle so that the reference value of the road surface angle θr is close to 0°.

As shown in FIG. 4, for example, if a vehicle 300 of which the pitch angle is inclined by the vehicle posture angle θv stops on a road having a road surface angle θr, gravity acceleration having a magnitude G is applied to the vehicle 300 and motion acceleration (motion deceleration) having a magnitude α is applied to the vehicle 300 in a direction where the vehicle 300 decelerates. This motion acceleration is a vector parallel to the road surface. Accordingly, an X-axis component, a Y-axis component, and a Z-axis component of the detected value vector (V=(x,y,z)) of the acceleration sensor 316 in this state can be represented by the following Formulas (1) to (3).

$$x = \alpha \cdot \cos\theta v + G \cdot \sin(\theta v + \theta r) \quad (1)$$

$$y = 0 \quad (2)$$

$$z = -\alpha \cdot \sin\theta v + G \cdot \cos(\theta v + \theta r) \quad (3)$$

Further, the square of the magnitude of the detected value vector V of the acceleration sensor 316 is represented by the following Formula (4).

$$\begin{aligned}\left|\vec{V}\right|^2 &= x^2 + y^2 + z^2 \\ &= \alpha^2 + G^2 + 2\alpha G \cdot \cos\theta v \cdot \sin(\theta v + \theta r) - \\ &\quad 2\alpha G \cdot \sin\theta v \cdot \cos(\theta v + \theta r) \\ &= \alpha^2 + G^2 + 2\alpha G \cdot \sin\theta r\end{aligned} \quad (4)$$

$|\vec{V}|^2$: Detected value vector of acceleration sensor

The following Formula (5) is obtained from the modification of Formula (4).

$$|\vec{V}|^2 - \alpha^2 = G^2 + 2\alpha G \cdot \sin\theta r \quad (5)$$

If the vehicle 300 stops on a horizontal road, that is, if the road surface angle θr is 0°, it is understood from Formula (5) that a difference between the square of the magnitude of the detected value vector V of the acceleration sensor 316 and the square of the magnitude α of the motion acceleration vector is equal to the square of the magnitude G of a gravity acceleration vector. Accordingly, it may be possible to determine whether the vehicle 300 is placed on a horizontal plane, by calculating the square of the magnitude α of the motion acceleration vector of the vehicle 300 obtained from the vehicle speed sensor 312 and the square of the magnitude of the detected value vector V of the acceleration sensor 316 and determining whether a difference between the square of the magnitude α of the motion acceleration vector and the square of the magnitude of the detected value vector V is equal to the square of the magnitude G of the gravity acceleration vector. Moreover, if a difference between the square of the magnitude of the detected value vector and the square of the magnitude of the motion acceleration vector before a predetermined time from the stop of the vehicle is equal to the square of the magnitude of the gravity acceleration vector, the controller 228R2 corrects the reference value of the road surface angle θr obtained at the time of the stop of the vehicle so that the reference value of the road surface angle θr is close to 0°. The amount of correction may be in the range of, for example, 0.01 to 0.1°.

Further, even when the vehicle starts, the detected value vector of the acceleration sensor 316, the motion acceleration vector, and the gravity acceleration vector satisfy the same relationship as the relationship at the time of the stop of the vehicle. Accordingly, if a difference between the square of the magnitude of the detected value vector and the square of the magnitude of the motion acceleration vector after a predetermined time from the start of the vehicle is equal to the square of the magnitude of the gravity acceleration vector, the controller 228R2 corrects the kept reference value of the road surface angle θr so that the kept reference value of the road surface angle θr is close to 0°. It may be possible to improve the accuracy of the automatic leveling control while suppressing the increase of the control load of the controller 228R2, by performing the above-mentioned correction at any one of the time of the start of the vehicle and the time of the stop of the vehicle. Furthermore, if the correction is performed at both the time of the start of the vehicle and the time of the stop of the vehicle, it may be possible to further improve the accuracy of the automatic leveling control.

"After a predetermined time from the start of the vehicle" and "before a predetermined time from the stop of the vehicle" mean time where the above-mentioned determination of whether a road surface is horizontal can be performed on a road surface of which the road surface angle θr is substantially the same as the road surface angle of the road surface of a place where the reference value of the road surface angle Or (which is an object to be corrected) is calculated. That is, when the vehicle starts, it may be possible to substantially determine whether the road surface of which the reference value of the road surface angle θr (which is an object to be corrected) is calculated is horizontal, by performing the determination of whether the road surface immediately after the start of the vehicle is horizontal. Further, when the vehicle stops, it may be possible to substantially determine whether the road surface of which the reference value of the road surface angle θr (which is an object to be corrected) is calculated is horizontal, by performing the determination of whether the road surface immediately before the stop of the vehicle is horizontal. Furthermore, as the result of the determination, if the reference value of the road surface angle θr is not 0° in spite of a horizontal road surface, it means that an error occurs between an actual road surface angle θr and the recorded reference value of the road surface angle θr. Accordingly, the reference value of the road surface angle θr is corrected so as to be close to 0°.

Accordingly, even though the vehicle posture angle θv is changed during the traveling of the vehicle, it may be possible to obtain the reference value of the road surface angle θr considering the change of the vehicle posture angle. Further, since the vehicle posture angle θv is calculated using the corrected reference value of the road surface angle θr, it may be possible to more accurately calculate the vehicle posture angle θv. "After a predetermined time from the start of the vehicle" and "before a predetermined time from the stop of the vehicle" may be appropriately set based on the experiments or simulations of a designer. Furthermore, the determination of whether a road surface is horizontal may be performed so that it is determined that a road surface is horizontal when a state where a difference between the square of the magnitude of the detected value vector and the square of the magnitude of the motion acceleration vector is equal to the square of the magnitude of the gravity acceleration vector continues for a predetermined time, for example, 3 seconds or more.

Figure 5:
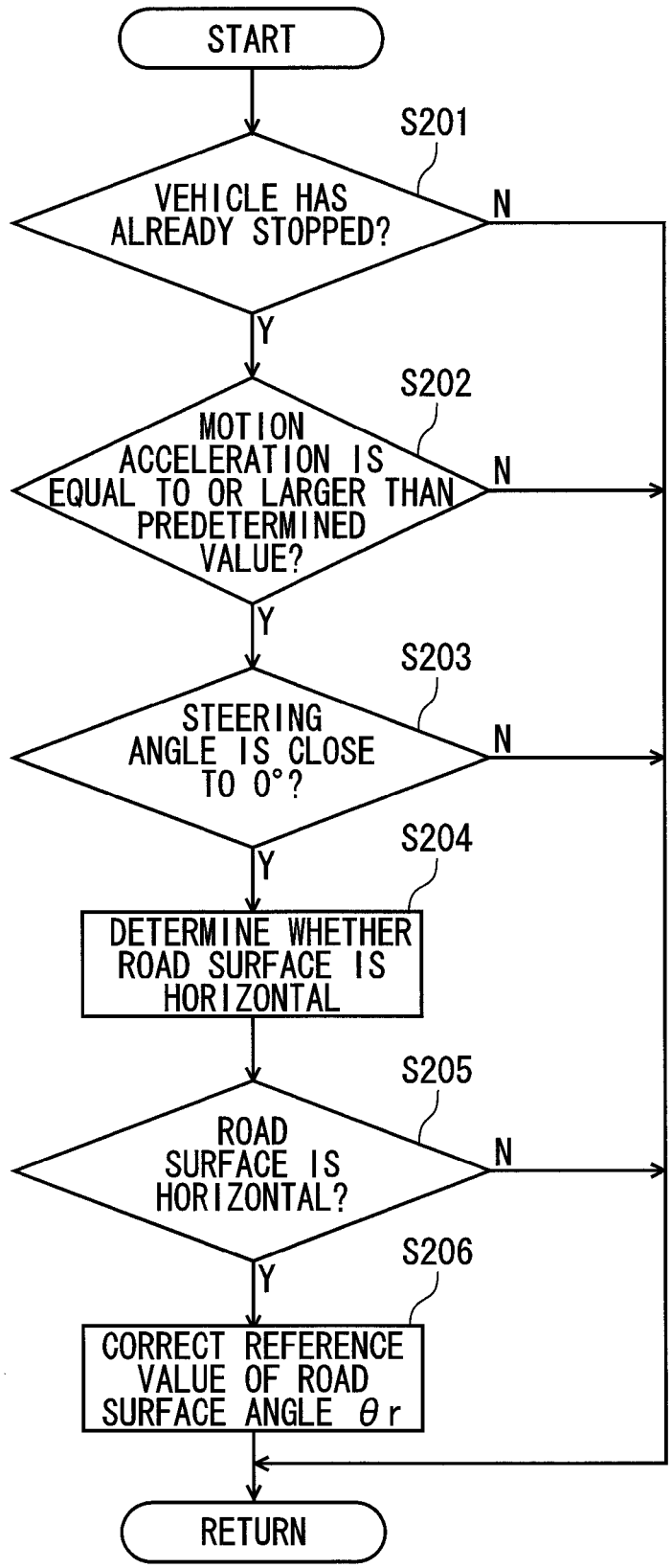
FIG. 5 is a control flowchart of the determination of whether a road surface is horizontal and the correction of a road surface angle at the time of the start of a vehicle in a vehicle lamp system according to the second embodiment.

FIG. 5 is a control flowchart of the determination of whether a road surface is horizontal and the correction of a road surface angle at the time of the start of a vehicle in the vehicle lamp system according to the second embodiment. For example, when an automatic leveling control mode is instructed by the light switch 304, this flow is repeated at a predetermined timing during the turning-on of the ignition by the controller 228R2 (irradiation controller 228R) and is ended at the time of the turning-off of the ignition. Further, this flow is appropriately combined with the control flow of the first embodiment.

First, the controller 228R2 determines whether a vehicle has already stopped (S201). If the vehicle has stopped yet (N in S201), the controller 228R2 ends this routine. If the vehicle has already stopped (Y in S201), the controller 228R2 determines whether the motion acceleration of the vehicle 300 is equal to or larger than a predetermined value (S202). If the motion acceleration is smaller than the predetermined value (N in S202), the controller 228R2 ends this routine. If the motion acceleration is equal to or larger than the predetermined value (Y in S202), the controller 228R2 determines whether a steering angle is close to 0° (S203).

If a steering angle is not close to 0° (N in S203), the controller 228R2 ends this routine. If a steering angle is close to 0° (Y in S203), the controller 228R2 determines whether a road surface is horizontal (S204). Further, the controller 228R2 determines whether a road surface is horizontal (S205). If the road surface is not horizontal (N in S205), the controller 228R2 ends this routine. If the road surface is horizontal (Y in S205), the controller 228R2 corrects the reference value of the road surface angle θr so that the reference value of the road surface angle θr is close to 0° (S206) and ends this routine.

Figure 6:
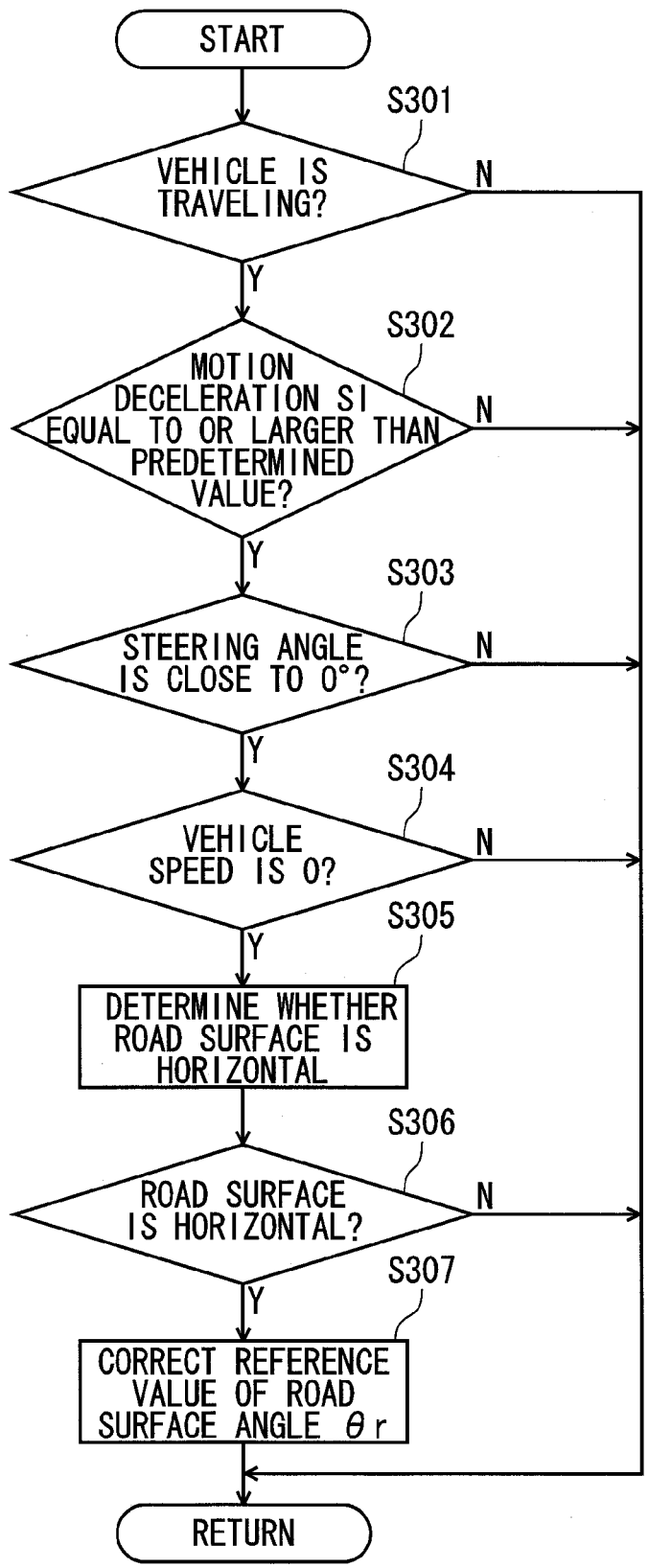
FIG. 6 is a control flowchart of the determination of whether a road surface is horizontal and the correction of a road surface angle at the time of the stop of a vehicle in the vehicle lamp system according to the second embodiment.

FIG. 6 is a control flowchart of the determination of whether a road surface is horizontal and the correction of a road surface angle at the time of the stop of a vehicle in the vehicle lamp system according to the second embodiment. For example, when an automatic leveling control mode is instructed by the light switch 304, this flow is repeatedly performed at a predetermined timing during the turning-on of the ignition by the controller 228R2 (irradiation controller 228R) and is ended at the time of the turning-off of the ignition. Further, this flow is appropriately combined with the control flow of the first embodiment.

First, the controller 228R2 determines whether a vehicle is traveling (S301). If the vehicle is not traveling (N in S301), the controller 228R2 ends this routine. If the vehicle is traveling (Y in S301), the controller 228R2 determines whether the motion deceleration of the vehicle 300 is equal to or larger than a predetermined value (S302). If the motion deceleration is smaller than the predetermined value (N in S302), the controller 228R2 ends this routine. If the motion deceleration is equal to or larger than the predetermined value (Y in S302), the controller 228R2 determines whether a steering angle is close to 0° (S303).

If a steering angle is not close to 0° (N in S303), the controller 228R2 ends this routine. If a steering angle is close to 0° (Y in S303), the controller 228R2 determines whether vehicle speed is 0 from the detected value of the vehicle speed sensor 312 (S304). If vehicle speed is not 0 (N in S304), the controller 228R2 ends this routine. If vehicle speed is 0 (Y in S304), the controller 228R2 determines whether a road surface is horizontal (S305) and determines whether a road surface is horizontal (S306). If the road surface is not horizontal (N in S306), the controller 228R2 ends this routine. If the road surface is horizontal (Y in S306), the controller 228R2 corrects the reference value of the road surface angle θr so that the reference value of the road surface angle θr is close to 0° (S307) and ends this routine.

In the vehicle lamp system 200 according as described above, the irradiation controllers 228L and 228R determine whether a road surface is horizontal at least at one timing of the time of the start of the vehicle and the time of the stop of the vehicle and correct the reference value of the road surface angle θr according to the result thereof. For this reason, even though the vehicle posture angle θv is changed during the traveling of the vehicle, it may be possible to obtain the reference value of the road surface angle θr considering the change of the vehicle posture angle. Accordingly, it may be possible to further improve the accuracy of the automatic leveling control.

(Third Embodiment)

A vehicle lamp system 200 according to a third embodiment considers the change of the road surface angle θr that is obtained during the stop of a vehicle in automatic leveling control. This embodiment will be described below. Meanwhile, the main structure of the vehicle lamp system 200, the main flow of automatic leveling control, and the shape of light distribution patterns that can be formed are the same as those of the first embodiment. Accordingly, the same elements as the elements of the first embodiment are denoted by the same reference numerals, and appropriately will not be described.

In the first embodiment, the change of a vehicle inclination angle (total angle θ) during the stop of the vehicle is estimated as the change of the vehicle posture angle θv. Accordingly, it may be possible to perform automatic leveling control with high accuracy by a simple control structure. However, although it is rare, the road surface angle θr may be changed during the stop of the vehicle. For example, if a vehicle 300 is transported or towed by a ship, a carrier, or the like, the road surface angle θr may be changed during the stop of the vehicle. For this reason, if the change of the total angle θ during the traveling of the vehicle is estimated as the change of the vehicle posture angle θv, there is a possibility that an error occurs between an actual vehicle posture angle θv and the estimated vehicle posture angle θv.

Further, in this embodiment, it is determined whether the vehicle posture angle θv obtained from the reference value of the road surface angle θr and the total angle θ is included in a predetermined range, and automatic leveling control is performed or is stopped according to the result of the determination.

If the vehicle posture angle θv calculated from the reference value of the road surface angle θr and the total angle θ detected by the acceleration sensor 316 exceeds a predetermined range, the controller 228R2 determines the position of the optical axis of the lamp unit 10 by the kept reference value of the vehicle posture angle θv. If the calculated vehicle posture angle θv is included in the predetermined range, the controller 228R2 determines the position of the optical axis by the calculated vehicle posture angle θv. Accordingly, it may be possible to improve the visibility of a driver of a subject vehicle while suppressing a concern that glare is directed at drivers of other vehicles. The "predetermined range" is a range obtained by adding a margin of 0.1° to the range of, for example, a vehicle posture angle θv when a vehicle is empty to a vehicle posture angle θv when the maximum load is applied to a luggage compartment, that is, the range of a vehicle posture angle θv that can be substantially taken by a vehicle 300. If the calculated vehicle posture angle θv exceeds this range, it may be possible to estimate that the calculated vehicle posture angle θv is different from an actual vehicle posture angle θv.

Meanwhile, if the calculated vehicle posture angle θv exceeds the predetermined range, the controller 228R2 may forbid generation of a control signal, which instructs the lamp unit to adjust the position of the optical axis. Specifically, if the calculated vehicle posture angle θv exceeds the predetermined range, the controller 228R2 stops the generation of a control signal (stops automatic leveling control). Further, the controller 228R2 notifies a user of the abnormality of automatic leveling control by turning on an indicator (not shown) through the vehicle controller 302. Furthermore, the controller 228R2 generates automatic leveling control-stop-information and records the automatic leveling control-stop-information in the memory 228R4. After that, if the automatic leveling control-stop-information is read out from the memory 228R4 even though automatic leveling control is instructed by the operation of the light switch 304 or the like, the controller 228R2 avoids performing automatic leveling control and turns on the indicator. When receiving a reset signal transmitted to the irradiation controller 228R through the operation of a switch, the communication of a CAN system at a dealer's maintenance shop, the controller 228R2 resets the reference value of the vehicle posture angle θv and the reference value of the road surface angle θr to 0°. Further, the controller 228R2 restores the automatic leveling control to an executable state by erasing or invalidating the automatic leveling control-stop-information. Accordingly, it may be possible to more reliably prevent glare from being directed at drivers of other vehicles.

Moreover, for example, power is not supplied to the irradiation controller 228R during the turning-off of the ignition. The controller 228R2 receives an IG-OFF signal generated from the vehicle controller 302 during the turning-off of the ignition when the memory 228R4 is not a nonvolatile memory, or not only the reference value of the road surface angle θr but also the reference value of the vehicle posture angle θv is recorded in a nonvolatile memory (not shown) when a power supply voltage supplied to the irradiation controller 228R is equal to or smaller than a predetermined voltage. Accordingly, even though the ignition is turned off, it may be possible to keep the reference value of the vehicle posture angle θv.

While the ignition is turned off, the vehicle 300 is often transported or towed by a ship, a carrier, or the like. Further, the controller 228R2 determines whether the calculated vehicle posture angle θv is included in a predetermined range during the turning-on of the ignition, and may perform the above-mentioned control based on the result of the determination.

Figure 7:
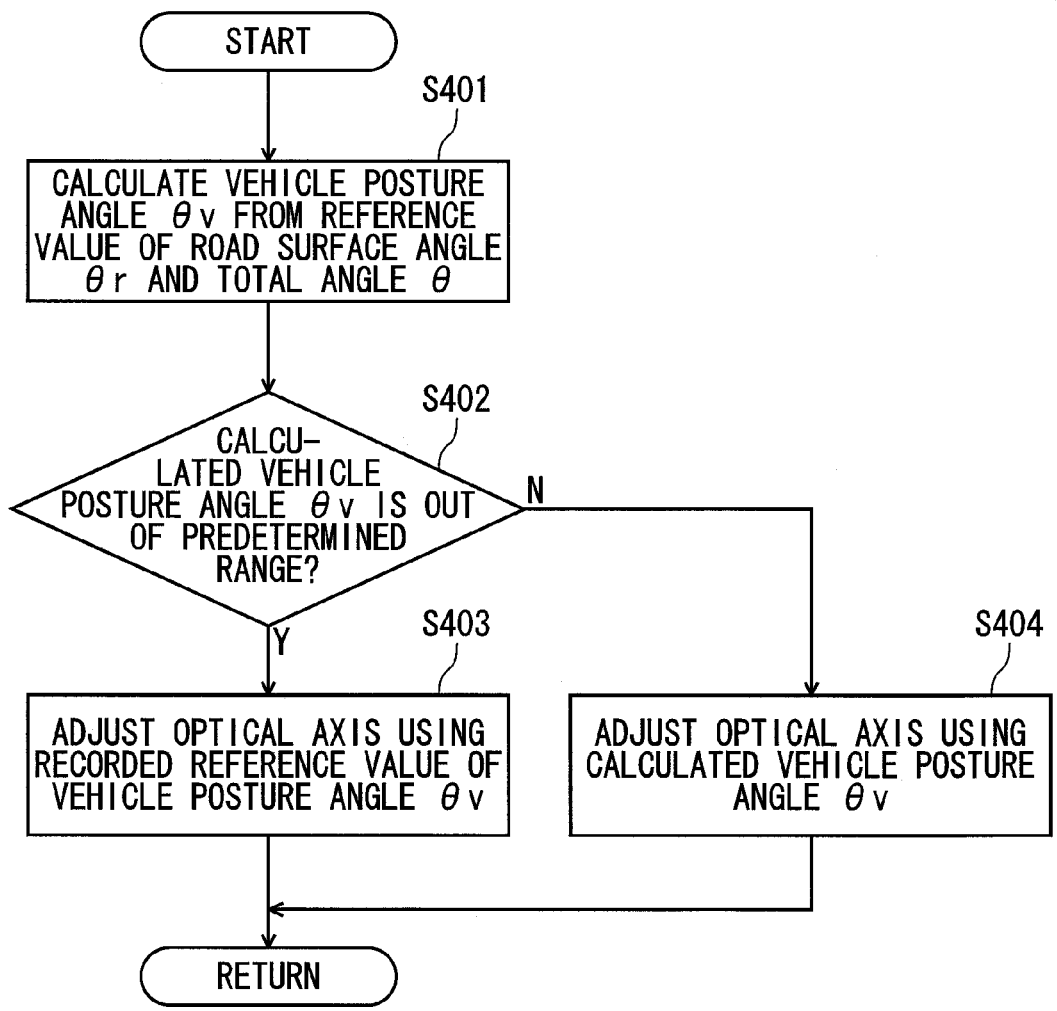
FIG. 7 is a control flowchart of determination of a vehicle posture angle θv in a vehicle lamp system according to a third embodiment.

FIG. 7 is a control flowchart of determination of a vehicle posture angle θv in a vehicle lamp system according to a third embodiment. For example, when the automatic leveling control mode is instructed by the light switch 304, this flow is repeatedly performed at a predetermined timing during the turning-on of the ignition by the controller 228R2 (irradiation controller 228R) and is ended at the time of the turning-off of the ignition. Further, this flow is appropriately combined with the control flow of the first embodiment.

First, the controller 228R2 calculates a vehicle posture angle θv from the reference value of the road surface angle θr and the total angle θ (S401), and determines whether the calculated vehicle posture angle θv is out of a predetermined range (S402). If the calculated vehicle posture angle θv is out of the predetermined range (Y in S402), the controller 228R2 adjusts the optical axis using the recorded reference value of the vehicle posture angle θv (S403) and ends this routine. If the calculated vehicle posture angle θv is in the predetermined range (N in S402), the controller 228R2 adjusts the optical axis using the calculated vehicle posture angle θv (S404) and ends this routine.

Figure 8:
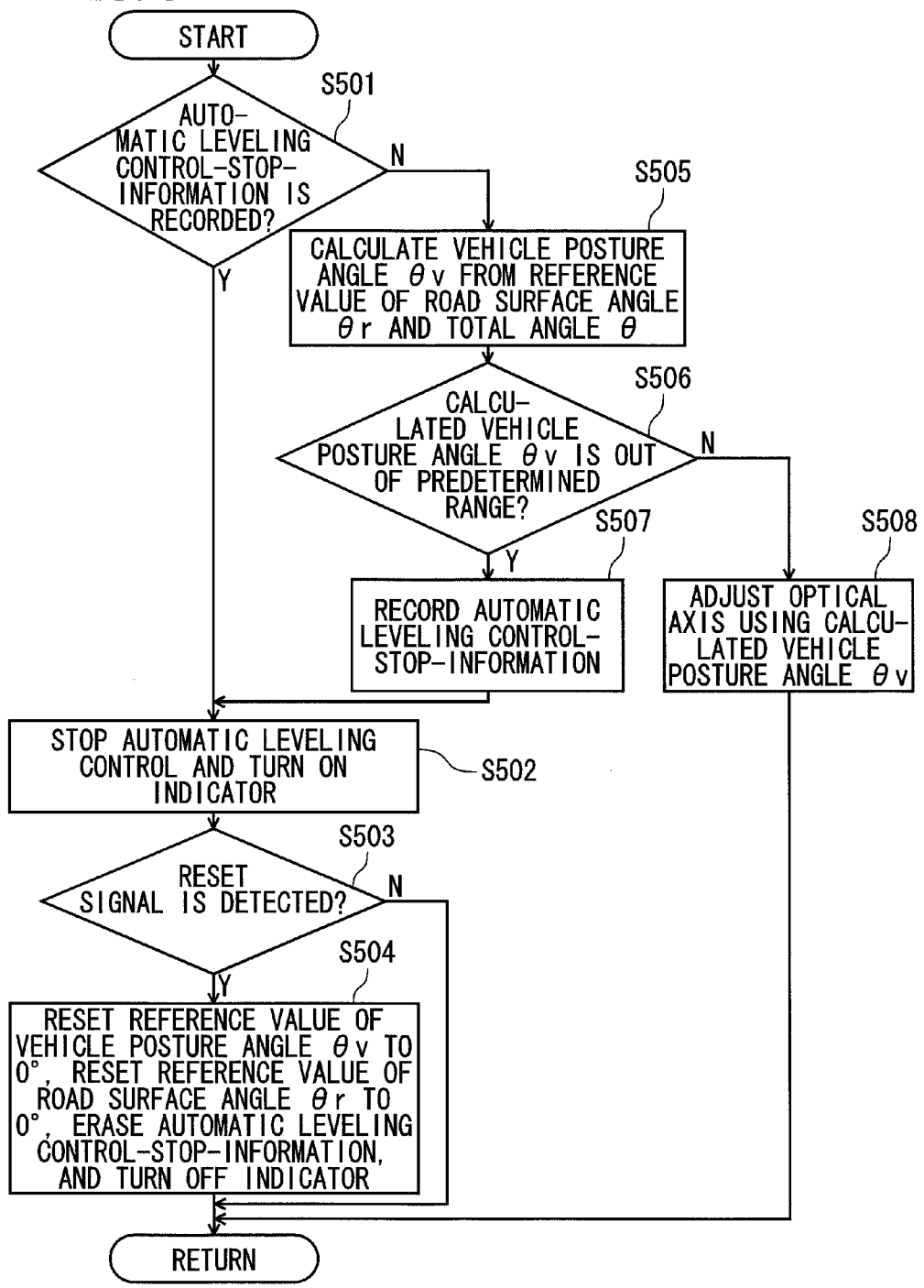
FIG. 8 is another control flowchart of determination of a vehicle posture angle θv in the vehicle lamp system according to the third embodiment.

FIG. 8 is another control flowchart of determination of a vehicle posture angle θv in the vehicle lamp system according to the third embodiment. For example, when the automatic leveling control mode is instructed by the light switch 304, this flow is repeatedly performed at a predetermined timing during the turning-on of the ignition by the controller 228R2 (irradiation controller 228R) and is ended at the time of the turning-off of the ignition. Further, this flow is appropriately combined with the control flow of the first embodiment.

First, the controller 228R2 determines whether automatic leveling control-stop-information is recorded in the memory 228R4 (S501). If the automatic leveling control-stop-information is recorded (Y in S501), the controller 228R2 stops the automatic leveling control and turns on the indicator (S502). Subsequently, the controller 228R2 determines whether a reset signal is detected (S503). If a reset signal is detected (Y in S503), the controller 228R2 resets the reference value of the vehicle posture angle θv and the reference value of the road surface angle θr to 0°, erases the automatic leveling control-stop-information, turns off the indicator (S504), and ends this routine. If a reset signal is not detected (N in S503), the controller 228R2 ends this routine.

If the automatic leveling control-stop-information is not recorded (N in S501), the controller 228R2 calculates a vehicle posture angle θv from the reference value of the road surface angle θr and the total angle θ (S505) and determines whether the calculated vehicle posture angle θv is out of a predetermined range (S506). If the calculated vehicle posture angle θv is out of the predetermined range (Y in S506), the controller 228R2 generates automatic leveling control-stop-information and records the automatic leveling control-stop-information in the memory 228R4 (S507). Further, the controller 228R2 stops automatic leveling control and turns on the indicator (S502). Subsequently, the controller 228R2 determines whether a reset signal is detected (S503), resets the reference value of the vehicle posture angle θv and the reference value of the road surface angle θr, erases the automatic leveling control-stop-information, turns off the indicator (S504), and ends this routine.

If the calculated vehicle posture angle θv is in the predetermined range (N in S506), the controller 228R2 adjusts the optical axis using the calculated vehicle posture angle θv (S508) and ends this routine.

In the vehicle lamp system 200 according to this embodiment as described above, the irradiation controllers 228L and 228R determines whether the calculated vehicle posture angle θv is included in the predetermined range. Further, if the calculated vehicle posture angle θv is out of the predetermined range, the irradiation controllers 228L and 228R performs automatic leveling control using the kept reference value of the vehicle posture angle θv. For this reason, even though the road surface angle θr is changed during the stop of the vehicle, it may be possible to perform the automatic leveling control considering the change of the road surface angle. Accordingly, it may be possible to improve the visibility of a driver of a subject vehicle while suppressing glare directed at drivers of other vehicles. Alternatively, if the calculated vehicle posture angle θv is out of the predetermined range, the irradiation controllers 228L and 228R stop automatic leveling control. Accordingly, it may be possible to reliably prevent glare from being directed at drivers of other vehicles.

Meanwhile, the vehicle lamp system 200 according to each embodiment is an aspect of the invention. The vehicle lamp system 200 includes the lamp units 10 that can adjust the optical axes O, the acceleration sensor 316 (inclination detector) that can detect the inclination angle of the vehicle 300 with respect to the horizontal plane, and the irradiation controllers 228L and 228R that control the lamp units 10. The vehicle lamp system 200 performs the above-mentioned automatic leveling control by the irradiation controllers 228L and 228R.

Another aspect of the invention may be the irradiation controllers 228L and 228R as control devices. The irradiation controllers 228L and 228R include the receivers 228L1 and 228R1, the controllers 228L2 and 228R2, and the transmitters 228L3 and 228R3, respectively. The receivers 228L1 and 228R1 receive the inclination angle of the vehicle 300 with respect to the horizontal plane from the acceleration sensor 316. The controllers 228L2 and 228R2 perform the above-mentioned automatic leveling control. The transmitters 228L3 and 228R3 transmit the control signals, which are generated by the controllers 228L2 and 228R2, to the leveling controllers 236. The irradiation controllers 228 of the vehicle lamp system 200 correspond to controllers in a broad sense, and the controllers 228L2 and 228R2 of the irradiation controllers 228 correspond to controllers in a narrow sense.

Further, another aspect of the invention may be the lamp unit 10 as a vehicle lamp. When the inclination angle of the vehicle 300 with respect to the horizontal plane is changed during the stop of the vehicle, the position of the optical axis of the lamp unit 10 is adjusted. When the inclination angle of the vehicle 300 with respect to the horizontal plane is changed during the traveling of the vehicle, the position of the optical axis of the lamp unit 10 is maintained.

Furthermore, another aspect of the invention may be a method of controlling the vehicle lamp. When adjusting the optical axis O of the lamp unit 10 based on the inclination angle, which is detected by the acceleration sensor 316, of the vehicle 300 with respect to the horizontal plane, this method adjusts the position of the optical axis when the inclination angle of the vehicle 300 with respect to the road surface is changed and maintains the position of the optical axis when the inclination angle of the road surface with respect to the horizontal plane is changed.

The determination of the traveling state of the subject vehicle in each of the above-mentioned embodiments (which includes the determination of whether a vehicle goes straight or the calculation of the motion acceleration of the vehicle 300), the determination of the position of the optical axis, and the determination of a light distribution pattern may be performed by any one of the vehicle controller 302 and the irradiation controllers 228. When the irradiation controllers 228 perform these kinds of determination, information output from various sensors or a navigation system is transmitted to the irradiation controllers 228 through the vehicle controller 302. Further, when the irradiation controllers 228 perform these kinds of determination, any one or both of the irradiation controllers 228L and 228R may perform these kinds of determination. Further, the irradiation controllers 228 may control the leveling actuators 226 as optical axis adjusters through the leveling controllers 236. That is, the irradiation controllers 228 may function as the leveling controllers 236. When the vehicle controller 302 perform these kinds of determination, the irradiation controllers 228 control the turning-on/off of the bulbs 14, the drive and the like of the swivel actuators 222, the leveling actuators 226, and the motors 238 based on the instructions from the vehicle controller 302. In this case, the vehicle controller 302 forms a control device that performs automatic leveling control.

While aspects of embodiments of the present invention have been shown and described above, other implementations are within the scope of the claims. It will be understood by those skilled in the art that various changes in form and details may be made therein without departing from the spirit and scope of the invention as defined by the appended claims.

What is claimed is:

1. A control device for controlling a vehicle lamp provided in a vehicle, the device comprising:
    a receiver configured to receive an inclination angle of the vehicle with respect to a horizontal plane from an inclination detector;
    a controller configured to:
    i) generate a first control signal instructing the vehicle lamp to adjust an optical axis of the vehicle lamp in response to a change of the inclination angle, when the vehicle has already stopped; and
    ii) generate a second control signal instructing the vehicle lamp to maintain the optical axis of the vehicle lamp, when the vehicle is traveling on a road surface; and
    a transmitter configured to transmit the first control signal or the second control signal to an optical axis adjuster provided in the vehicle lamp;
    wherein the inclination angle comprises:
    a first angle that represents an inclination angle of the road surface with respect to the horizontal plane; and
    a second angle that represents an inclination angle of the vehicle with respect to the road surface,
    wherein the controller is configured to record a first reference angle of the first angle and a second reference angle of the second angle, wherein the first reference angle is obtained based on the second reference angle and the inclination angle received from the inclination detector when the vehicle is about to stop, and
    wherein when the inclination angle is changed in a case where the vehicle has already stopped, the controller determines the optical axis based on the second angle that is obtained based on the first reference angle and the inclination angle received from the inclination detector, and the controller records the obtained second angle as a new second reference angle.

2. The device of claim 1,
    wherein the inclination detector is an acceleration sensor configured to detect the inclination angle of the vehicle as a vector value, and
    wherein
    if a difference between a square of a magnitude of the vector value detected by the acceleration sensor and a square of a magnitude of an acceleration vector of the vehicle detected by a vehicle speed sensor before a predetermined time from a stop of the vehicle is equal to a square of a magnitude of a gravity acceleration vector, the controller updates the recorded first reference angle such that the recorded first reference angle is close to 0°.

3. The device of claim 1,
    wherein when the control device is started, the controller determines the optical axis based on the second angle that is obtained based on the first reference angle and the inclination angle received from the inclination detector, and records the obtained second angle as a new second reference angle.

4. The device of claim 1,
    wherein if the obtained second angle exceeds a given range, the controller determines the optical axis based on the second reference angle recorded in the controller.

5. The device of claim 1,
    wherein if the obtained second angle exceeds a given range, the controller does not generate the second control signal.

6. A vehicle lamp provided in a vehicle,
    wherein an optical axis of the vehicle lamp is adjusted in response to a change of an inclination angle of the vehicle with respect to a horizontal plane, when the vehicle has already stopped, and
    wherein the optical axis is maintained even if the inclination angle is changed, when the vehicle is travelling on a road surface;
    wherein the inclination angle comprises
    a first angle that represents an inclination angle of the road surface with respect to the horizontal plane; and
    a second angle that represents an inclination angle of the vehicle with respect to the road Surface,
    wherein a first reference angle of the first angle and a second reference angle of the second angle are recorded, wherein the first reference angle is obtained based on the second reference angle and the inclination angle received when the vehicle is about to stop, and
    wherein when the inclination angle is changed in a case where the vehicle has already stopped, the optical axis is determined based on the second angle that is obtained based on the first reference angle and the inclination angle, and the controller records the obtained second angle as a new second reference angle.

7. A method of controlling a vehicle lamp provided in a vehicle, the method comprising:
    detecting an inclination angle of the vehicle with respect to a horizontal plane;
    adjusting an optical axis of the vehicle lamp in response to a change of the inclination angle, when the vehicle has already stopped; and
    maintaining the optical axis of the vehicle lamp, when the vehicle is traveling on a road surface;
    wherein the inclination angle comprises
    a first angle that represents an inclination angle of the road surface with respect to the horizontal plane; and
    a second angle that represents an inclination angle of the vehicle with respect to the road surface,
    wherein a first reference angle of the first angle and a second reference angle of the second angle are recorded, wherein the first reference angle is obtained based on the second reference angle and the inclination angle received when the vehicle is about to stop, and
    wherein when the inclination angle is changed in a case where the vehicle has already stopped, the optical axis is determined based on the second angle that is obtained based on the first reference angle and the inclination angle, and the controller records the obtained second angle as a new second reference angle.

8. A vehicle lamp system comprising:
    a vehicle lamp mounted in a vehicle so as to irradiate an area in front of the vehicle with light;
    an inclination detector that detects an inclination angle of the vehicle with respect to a horizontal plane;
    an optical axis adjuster that adjusts an optical axis of the vehicle lamp; and
    a control device for controlling the vehicle lamp, the device comprising:
    a receiver configured to receive the inclination angle from the inclination detector;
    a controller configured to:

i) generate a first control signal instructing the vehicle lamp to adjust the optical axis of the vehicle lamp in response to a change of the inclination angle, when the vehicle has already stopped; and ii) generate a second control signal instructing the vehicle lamp to maintain the optical axis of the vehicle lamp, when the vehicle is traveling on a road surface; and a transmitter configured to transmit the first control signal or the second control signal to the optical axis adjuster, wherein the optical axis adjuster adjusts the optical axis of the vehicle lamp based on the first control signal or the second control signal;

wherein the inclination angle comprises:

a first angle that represents an inclination angle of the road surface with respect to the horizontal plane; and a second angle that represents an inclination angle of the vehicle with respect to the road surface wherein the controller is configured to record a first reference angle of the first angle and a second reference angle of the second angle, wherein the first reference angle is obtained based on the second reference angle and the inclination angle received from the inclination detector when the vehicle is about to stop, and wherein when the inclination angle is changed in a case where the vehicle has already stopped, the controller determines the optical axis based on the second angle that is obtained based on the first reference angle and the inclination angle received from the inclination detector, and the controller records the obtained second angle as a new second reference angle.

\* \* \* \* \*